(12) United States Patent
Hong et al.

(10) Patent No.: US 11,435,462 B2
(45) Date of Patent: Sep. 6, 2022

(54) ELECTRONIC DEVICE FOR PERFORMING RANGING AND METHOD THEREOF

(71) Applicant: Samsung Electronics Co., Ltd., Gyeonggi-do (KR)

(72) Inventors: Sukgi Hong, Gyeonggi-do (KR); Sehwan Choi, Gyeonggi-do (KR); Moonseok Kang, Gyeonggi-do (KR); Hyunchul Kim, Gyeonggi-do (KR); Jungsik Park, Gyeonggi-do (KR); Yi Yang, Gyeonggi-do (KR); Sejong Yoon, Gyeonggi-do (KR); Jonghyo Lee, Gyeonggi-do (KR); Jonghoon Jang, Gyeonggi-do (KR); Seongah Jeong, Gyeonggi-do (KR)

(73) Assignee: Samsung Electronics Co., Ltd

( * ) Notice: Subject to any disclaimer, the term of this patent is extended or adjusted under 35 U.S.C. 154(b) by 193 days.

(21) Appl. No.: 16/915,363

(22) Filed: Jun. 29, 2020

(65) Prior Publication Data

US 2021/0003685 A1    Jan. 7, 2021

(30) Foreign Application Priority Data

Jul. 1, 2019   (KR) .................. 10-2019-0078582

(51) Int. Cl.
*H01Q 1/24*  (2006.01)
*G01S 11/02*  (2010.01)
(Continued)

(52) U.S. Cl.
CPC .............. *G01S 11/023* (2013.01); *H01Q 5/25* (2015.01); *H01Q 21/28* (2013.01)

(58) Field of Classification Search
CPC ......... G01S 11/023; H01Q 5/25; H01Q 21/28
See application file for complete search history.

(56) References Cited

U.S. PATENT DOCUMENTS 89,924,318        3/2018   Ghabra et al.
2014/0347233 A1*  11/2014  Mahanfar .............. H01Q 1/521
                                              343/720
(Continued)

FOREIGN PATENT DOCUMENTS

CN    107607909    1/2018
GB    2 551 861    1/2018
(Continued)

OTHER PUBLICATIONS

International Search Report dated Sep. 29, 2020 issued in counterpart application No. PCT/KR2020/008459, 8 pages.
(Continued)

*Primary Examiner* — Dieu Hien T Duong
(74) *Attorney, Agent, or Firm* — The Farrell Law Firm, P.C.

(57) ABSTRACT

A method and an electronic device for ranging are provided. An ultra-wideband (UWB) signal is received from an external device through a first antenna. A communication state between the external device and the electronic device is identified using information about communication quality included in the UWB signal. A signal received through a second antenna is identified by decoding the received signal based on the identified communication state. A distance between the electronic device and the external device is determined based on whether the received signal is a low frequency (LF) signal.

20 Claims, 8 Drawing Sheets

(51) Int. Cl.
    *H01Q 5/25*    (2015.01)
    *H01Q 21/28*    (2006.01)

(56)             References Cited

U.S. PATENT DOCUMENTS

| | | |
|---|---|---|
| 2015/0208207 A1 | 7/2015 | Ye et al. |
| 2017/0151928 A1 | 6/2017 | Kang et al. |
| 2017/0345240 A1 | 11/2017 | Bergerhoff et al. |
| 2018/0099643 A1 | 4/2018 | Golsch et al. |
| 2018/0234797 A1 | 8/2018 | Ledvina et al. |
| 2019/0004155 A1 | 1/2019 | Eber et al. |
| 2019/0263356 A1 | 8/2019 | Golsch et al. |
| 2019/0297457 A1 | 9/2019 | Ledvina et al. |
| 2020/0247363 A1 | 8/2020 | Golsch et al. |

FOREIGN PATENT DOCUMENTS

| | | |
|---|---|---|
| WO | WO 2016/059451 | 4/2016 |
| WO | WO 2019/110833 | 6/2019 |

OTHER PUBLICATIONS

Vighnesh Gharat et al., "Indoor Performance Analysis of LF-RFID based Positioning System: Comparison UHF-RFID and UWB", XP033261493, 2017 International Conference on Indoor Positioning and Indoor Navigation (IPIN), Sep. 18-21, 2017, 8 pages.
European Search Report dated May 3, 2022 issued in counterpart application No. 20834479.6-12606, 12 pages.

\* cited by examiner

ELECTRONIC DEVICE FOR PERFORMING RANGING AND METHOD THEREOF

CROSS-REFERENCE TO RELATED APPLICATION(S)

This application is based on and claims priority under 35 U.S.C. § 119(e) to Korean Patent Application No. 10-2019-0078582, filed on Jul. 1, 2019, in the Korean Intellectual Property Office, the disclosure of which is incorporated by reference herein in its entirety.

BACKGROUND

1. Field

The disclosure relates to an electronic device for performing ranging and a method thereof.

2. Description of Related Art

An electronic device may perform wireless communication with an external device by using an ultra-wideband (UWB) network. The UWB network may refer to a wireless communication technology by which data is transmitted through an ultra-wideband frequency band. The UWB network may be based on the IEEE 802.15.4 standard specification defined by the Institute of Electrical and Electronic Engineers (IEEE).

When a vehicle, which may be an external device, is to be controlled through an electronic device, the electronic device may perform ranging using an UWB signal. The accuracy of ranging is important because if the ranging is not performed accurately, it may be difficult to provide a service to a user of the electronic device. When there are many obstacles or an electronic device is located in a pocket of a user, the ranging accuracy between the electronic device and the vehicle may be reduced due to interference.

In an environment in which there are many factors causing interference, the accuracy of ranging may be higher when using a low frequency (LF) signal than when using a UWB signal. However, when using the LF signal, security is more vulnerable.

An electronic device may determine whether it is in a line of sight (LOS) environment or a non-line of sight (NLOS) environment, by using a UWB signal. Even when the NLOS environment is identified, the accuracy of ranging may be secured at a certain level.

SUMMARY

The disclosure has been made to address at least the above problems and/or disadvantages and to provide at least the advantages described below. Accordingly, an aspect of the disclosure provides an electronic device and method for performing ranging by detecting whether an LF signal is received only in a certain state based on information included in an UWB signal.

In accordance with an aspect of the disclosure, an electronic device is provided that includes a first antenna, a second antenna, a communication module that transmits and receives UWB signals by using the first antenna, a power transceiver module that transmits and receives signals related to charging of the electronic device and LF signals by using the second antenna, and a processor operatively connected to the communication module, the power transceiver module, the first antenna, and the second antenna. The communication module is configured to receive an UWB signal from an external device, and identify a communication state between the external device and the electronic device using information about communication quality included in the UWB signal. The communication module is also configured to identify a signal received by the power transceiver module by decoding the received signal based on the identified communication state, and determine a distance between the electronic device and the external device based whether the received signal is an LF signal.

In accordance with another aspect of the disclosure, a ranging method of an electronic device is provided. A UWB signal is received from an external device through a first antenna. A communication state between the external device and the electronic device is identified using information about communication quality included in the UWB signal. A signal received through a second antenna is identified by decoding the received signal based on the identified communication state. A distance between the electronic device and the external device is determined based on whether the received signal is a LF signal.

In accordance with still another aspect of the disclosure, an electronic device is provided that includes a first antenna, a second antenna, a communication module that transmits and receives UWB signals using the first antenna, a power transceiver module that transmits and receives signals related to charging of the electronic device and LF signals using the second antenna, and a processor operatively connected to the communication module, the power transceiver module, the first antenna, and the second antenna. The communication module is configured to receive an UWB signal from an external device through the first antenna, and identify a communication state between the external device and the electronic device by using information about communication quality included in the UWB signal. The communication module is also configured to identify that the power transceiver module receives an LF signal from the external device by decoding a signal received at the power transceiver module through the second antenna, when the communication state is a NLOS environment and the information about the communication quality is less than a specified first threshold value. The communication module is also configured to determine a distance between the external device and the electronic device by using the UWB signal, when the information about the communication quality is greater than or equal to a specified second threshold value, and identify that the electronic device is located inside the external device when the LF signal is identified.

BRIEF DESCRIPTION OF THE DRAWINGS

The above and other aspects, features, and advantages of embodiments of the disclosure will be more apparent from the following description when taken in conjunction with the accompanying drawings, in which.

DETAILED DESCRIPTION

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
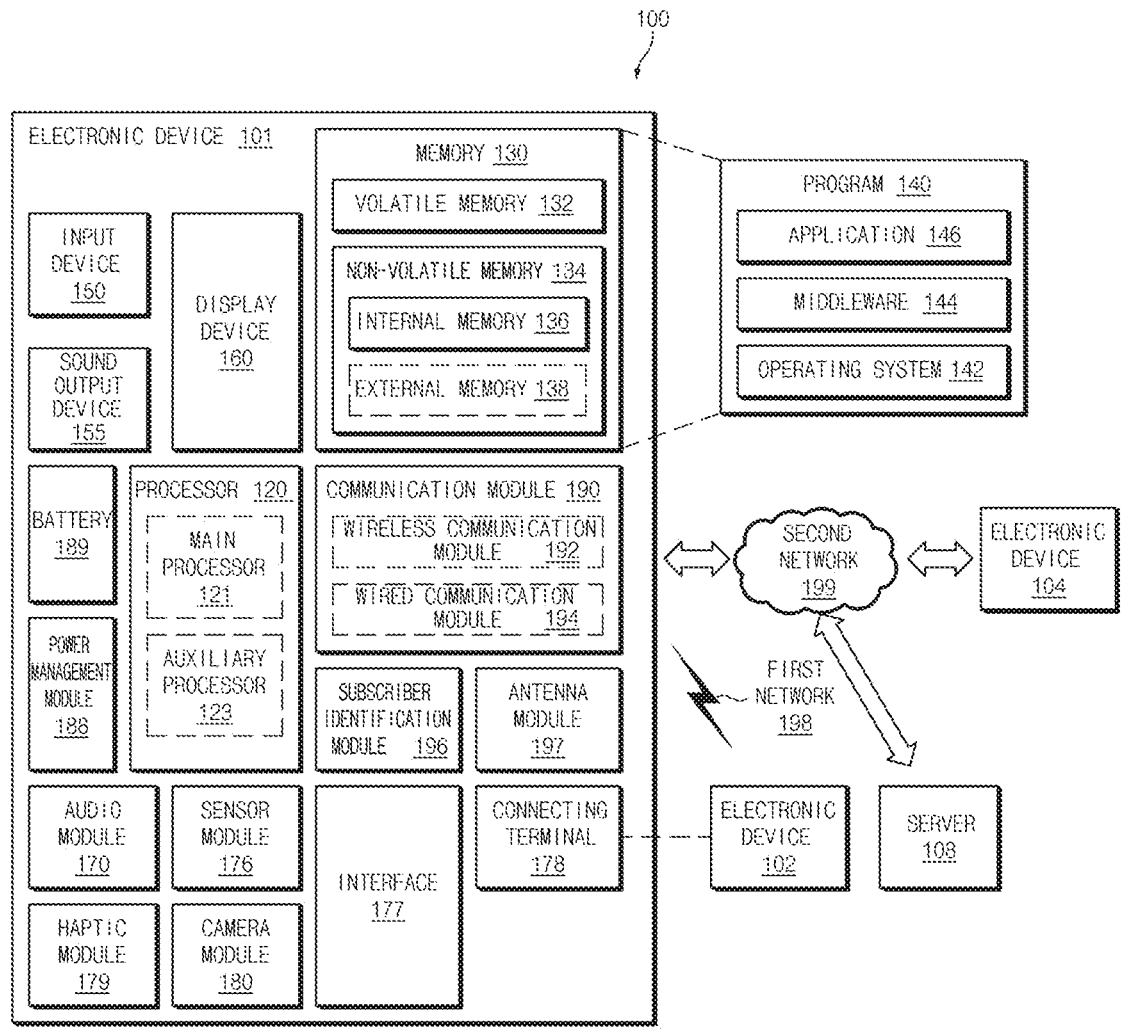
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Hereinafter, an electronic device 200, according to an embodiment, is described with reference to FIGS. 2 and 3.

Figure 2:
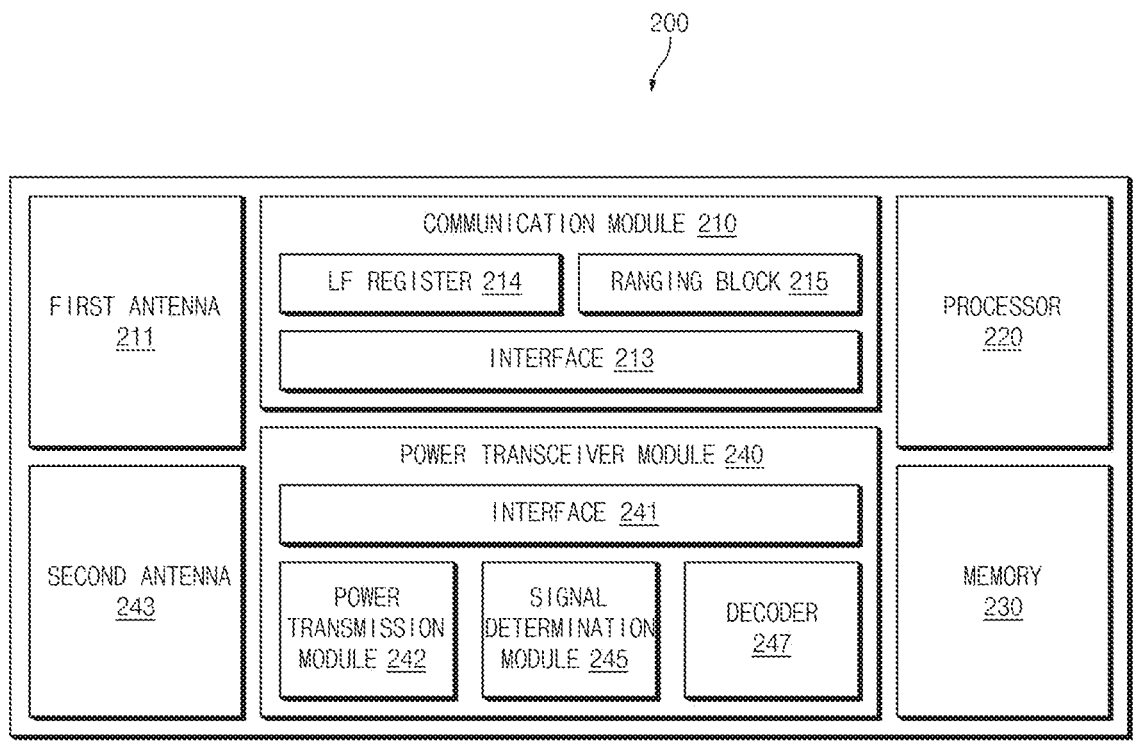
FIG. 2 is a block diagram of an electronic device according to an embodiment.

FIG. 2 is a block diagram of the electronic device 200 according to an embodiment. FIG. 3 is a diagram illustrating a first antenna and a second antenna included in the electronic device 200 according to an embodiment.

Referring to FIG. 2, the electronic device 200 (e.g., the electronic device 101 of FIG. 1) includes a communication module 210, a power transceiver module 240, a processor 220, and a memory 230.

The electronic device 200 may be embodied as a smart phone, a tablet, a wearable device, a home appliance, or a digital camera.

The electronic device 200 may include additional components in addition to those illustrated in FIG. 2. For example, the electronic device 200 may include a communication module or connection terminal for communicating with an external device (e.g., the electronic device 102 and/or the electronic device 104 of FIG. 1). The components of the electronic device 200 may be the same entity or may constitute a separate entity.

The communication module 210 may be embodied as a communication module set to perform UWB communication. The power transceiver module 240 may be embodied as a communication module configured to transmit/receive a low frequency (LF) signal or a signal related to charging of the electronic device 200.

The communication module 210 includes an interface 213, an LF register 214, and a ranging block 215.

The LF register 214 may store a result of determining whether the power transceiver module 240 has received an LF signal. For example, the ranging block 215 may control an algorithm (e.g., time of flight (ToF) or angle of arrival (AoA)) related to ranging when performing ranging based on a UWB signal.

The interface 213 may communicate with the power transceiver module 240 and/or the processor 220. The interface 213 may be embodied as a serial peripheral interface (SPI) or an inter integrated circuit (I2C).

The communication module 210 may access the power transceiver module 240 through the interface 213 to determine whether the power transceiver module 240 has received an LF signal from an external device.

The communication module 210 may be provided from the processor 220 with the result that the power transceiver module 240 receives an LF signal from an external device through the interface 213.

Figure 3:
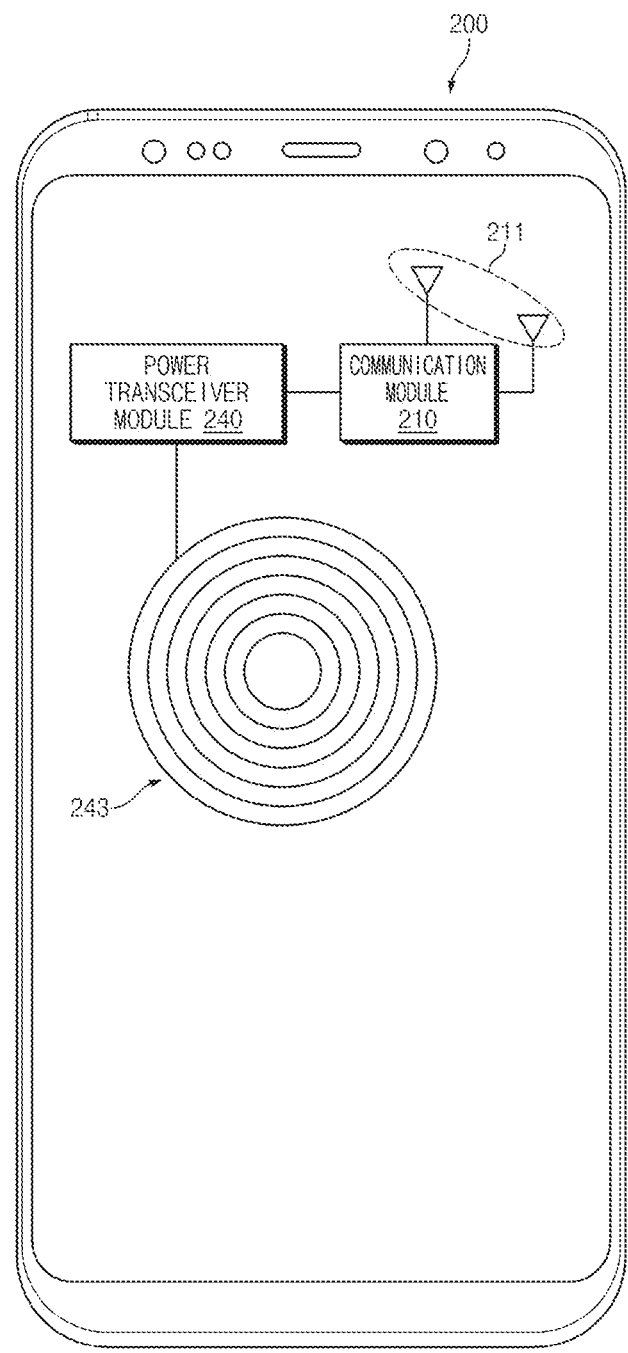
FIG. 3 is a diagram illustrating a first antenna and a second antenna included in an electronic device according to an embodiment.

Referring to FIG. 3, a first antenna 211 may be connected to the communication module 210. The communication module 210 may transmit the UWB signal to the external device by using the first antenna 211 and receive the UWB signal from the external device.

Referring back to FIG. 2, the communication module 210 may perform ranging with an external device based on the UWB signal received from the external device through the first antenna 211. For example, the UWB signal may be a signal having a frequency band of 499.2 MHz or higher. As another example, the UWB signal may be a signal having a frequency band of 1 GHz corresponding to channel characteristics. The electronic device 200 may transmit and receive a signal including time information to perform ranging with an external device by using a UWB signal.

The ranging may include measuring a distance between the electronic device 200 and an external device. For example, the electronic device 200 (e.g., the communication module 210) may receive a UWB signal from an external device through the first antenna 211, and use time information (e.g., time stamp information) of the received UWB signal to measure the distance between the electronic device 200 and the external electronic device.

The communication module 210 may identify the communication state between the electronic device 200 and the external device by using the communication quality related information included in the UWB signal received from the external device through the first antenna 211.

The communication quality related information may be information indicating the quality of wireless communication between the external device and the electronic device 200. The communication quality related information may also be information indicating the performance of wireless communication between the external device and the electronic device 200. The communication quality related information may further be information about the sensitivity of transmission and reception of wireless communication between the external device and the electronic device 200. The communication quality related information may additionally be information represented by one of a signal-to-noise ratio (SNR) or a received signal strength indicator (RSSI) between the external device and the electronic device 200. The communication state may include an LOS environment and an NLOS environment.

The communication module 210 may identify a communication state by comparing a first threshold value and/or a second threshold value with the communication quality related information.

The communication module 210 may identify that the communication state is an LOS environment, based on the communication quality related information being greater than or equal to the specified second threshold value. When it is identified that the communication state is the LOS environment, the communication module 210 may determine the distance between the external device and the electronic device 200 by using the UWB signal. For example, the distance between the electronic device 200 and the external device may be determined based on time information (e.g., time stamp information) of the UWB signal received from the external device. The reliability (or accuracy) of the distance between the electronic device 200 and the external device determined in the LOS environment may be higher than that of the distance between the electronic device 200 and the external device determined in the NLOS environment.

The communication module 210 may identify that the communication state is an NLOS environment, based on the communication quality related information being less than the specified second threshold value. When it is identified that the communication state is an NLOS environment, the communication module 210 may determine whether communication quality related information is less than the specified first threshold value.

When the communication quality related information is less than the specified second threshold value, and is greater than or equal to the specified first threshold value, the communication module 210 may determine the distance between the external device and the electronic device 200 by considering that the communication state is identified as an NLOS environment. For example, when the communication quality related information is less than the specified second threshold value and is greater than or equal to the specified first threshold value, the communication module 210 may determine the distance between the external device and the electronic device 200 by using the UWB signal, but not limited thereto. For example, the reliability (or accuracy) of the distance between the external device and the electronic device 200 determined when the communication state is the LOS environment may be higher than that of the distance between the external device and the electronic device 200 determined when the communication state is the NLOS environment.

When the communication quality related information is less than the specified second threshold value and less than the specified first threshold value, the communication module 210 may determine whether the power transceiver module 240 has received the LF signal. For example, the communication module 210 may identify that the power transceiver module 240 has received a signal from the external device through the second antenna 243. The communication module 210 may determine whether the signal received by the power transceiver module 240 through the second antenna 243 is a signal related to charging of the electronic device 200 or an LF signal. For example, the communication module 210 may obtain a result of determining whether the signal received through the second antenna 243 by the power transceiver module 240 is a signal related to charging of the electronic device 200 or an LF signal from a signal determination module 245 through an interface 241. For example, when a wake-up pattern exists as the result of the power transceiver module 240 decoding a signal received through the second antenna 243, it may be identified that the signal received by the power transceiver module 240 is an LF signal. Based on that the power transceiver module 240 receives the LF signal, the communication module 210 may identify that the electronic device 200 is located within a specified distance from an LF antenna of the external device. When the reliability of location measurement using the UWB signal is reduced, the electronic device 200 may compensate for the location measurement by determining whether the power transceiver module 240 receives the LF signal.

The external device may be a vehicle, and the communication module 210 may identify that the electronic device 200 is located inside the vehicle based on the power transceiver module 240 receiving the LF signal.

Referring again to FIG. 3, a second antenna 243 may be connected to the power transceiver module 240. The power transceiver module 240 may receive a signal related to charging of the electronic device 200 and an LF signal from an external device by using the second antenna 243. For example, the second antenna 243 may support a low frequency band of 100 to 200 KHz.

Referring back to FIG. 2, the power transceiver module 240 includes the interface 241, a power transmission module 242, the signal determination module 245, and a decoder 247. However, the power transceiver module 240 may further include additional components as necessary. In addition, some of the components of the power transceiver module 240 may be configured as separate modules as necessary.

The power transceiver module 240 may communicate with the communication module 210 and/or the processor 220 through the interface 241. The communication module 210 may determine whether the signal received from an external device by the power transceiver module 240 is a signal related to charging of the electronic device 200 or an LF signal, through the interface 241 of the power transceiver module 240. The processor 220 may determine whether the signal received from an external device by the power transceiver module 240 is a signal related to charging of the electronic device 200 or an LF signal, through the interface 241 of the power transceiver module 240.

The power transceiver module 240 may be a module capable of performing wireless charging of the electronic device 200. For example, the power transceiver module 240 may receive a signal related to charging of the electronic device 200 as well as an LF signal. When the power transceiver module 240 receives a signal related to charging of the electronic device 200 from an external device, the electronic device 200 may be charged. For example, when the power transceiver module 240 is charged based on the signal received from an external device, the power transmission module 242 may transmit power obtained by charging to the electronic device 200. The power transceiver module 240 may allow the electronic device 200 to be charged based on a power matters alliance (PMA) standard or a wireless power consortium (WPC) standard.

When the signal determination module 245 receives a signal from an external device through the second antenna 243 while the rectified power of at least 2.7 V is maintained for at least 20 milliseconds (ms) in the power transceiver module 240 and the power transceiver module 240 operates, the signal determination module 245 may determine whether the received signals is a signal related to charging of the electronic device 200 or an LF signal.

The signal determination module 245 may determine whether the signal received from an external device through the second antenna 243 is a WPC related signal, a PMA related signal, or an LF signal. The signal determination module 245 may decode the received signal by using the decoder 247 to identify the type of a signal. The signal received by the power transceiver module 240 from an external device through the second antenna 243 may be input to the decoder 247. The decoder 247 may decode a WPC related signal, a PMA related signal, and an LF signal.

The signal determination module 245 may decode the wake up pattern of the LF signal by using the decoder 247, and identify that the signal received from the external device through the second antenna 243 is an LF signal. The wake up pattern may be a typical component of the LF signal, and may be manchester-coded.

When the signal received from the external device through the second antenna 243 is not decoded by the decoder 247, the signal determination module 245 may identify that the signal received from the external device is noise.

Referring to Table 1, the electronic device 200 may identify communication quality related information through a figure of merit (FoM) included in the UWB signal. For example, the communication quality related information may be defined using FoM of the IEEE 802.15.4 standard specification. The FoM may be a part of data included in a ranging packet when the ranging packet including a time stamp is exchanged between the electronic device 200 and an external device. For example, the FoM may be composed of 8 bits, as shown in Table 1. The FoM may indicate the reliability of the time stamp.

TABLE 1

| Bit 7 | Bit 6 | Bit 5 | Bit 4 | Bit 3 | Bit 2 | Bit 1 | Bit 0 |
|---|---|---|---|---|---|---|---|
| Extension | Confidence Interval Scaling Factor field | | Confidence Interval field | | Confidence Level Interval | | |

Referring to Table 2, the communication quality related information may be identified based on Bit 2, Bit 1, and Bit 0 received by using the confidence level field of the FoM. The electronic device 200 may compare values of Bit 2, Bit 1, and Bit 0 corresponding to the confidence level of the FoM with Table 2.

TABLE 2

| Confidence Level | Bit 2 | Bit 1 | Bit 0 |
|---|---|---|---|
| No FoM | 0 | 0 | 0 |
| 20% | 0 | 0 | 1 |
| 55% | 0 | 1 | 0 |
| 75% | 0 | 1 | 1 |
| 85% | 1 | 0 | 0 |
| 92% | 1 | 0 | 1 |

TABLE 2-continued

| Confidence Level | Bit 2 | Bit 1 | Bit 0 |
|---|---|---|---|
| 97% | 1 | 1 | 0 |
| 99% | 1 | 1 | 1 |

The specified first threshold value may be a case where the confidence level is 55%, and the specified second threshold value may be a case where the confidence level is 85%. The specified first threshold value may be a case where (Bit 2, Bit 1, Bit 0) is (0, 1, 0), and the specified second threshold value may be a case where (Bit 2, Bit 1, Bit 0) is (1, 0, 0).

When (Bit 2, Bit 1, Bit 0) is (0, 1, 1), the electronic device 200 may identify that the communication state is an NLOS environment based on the confidence level being 75%, and because the communication quality related information is greater than or equal to the specified first threshold value (e.g., (0, 1, 0)), the electronic device 200 may perform ranging by using the UWB signal. When (Bit 2, Bit 1, Bit 0) is (0, 0, 1), the electronic device 200 may identify that the communication state is an NLOS environment based on the confidence level being 20%, and because the communication quality related information is less than the specified first threshold value (e.g., (0, 1, 0)), the electronic device 200 may determine whether the power transceiver module 240 has received the LF signal, thereby identifying that the electronic device 200 is located within a specified distance from the LF antenna of the external device.

The processor 220 may be operatively coupled to the communication module 210, the power transceiver module 240, and the memory 230 to perform overall functions of the electronic device 200. For example, the processor 220 may include one or more processors. The one or more processors may include an ISP, an AP, or a CP.

The processor 220 may determine whether the power transceiver module 240 has received the LF signal from the LF antenna of the external device. The processor 220 may provide the communication module 210 with the result of determining whether the power transceiver module 240 has received the LF signal.

The memory 230 may store instructions, information, or data associated with the operations of components included in the electronic device 200. For example, the memory 230 may store instructions that, when executed, cause the processor 220 to perform various operations described herein.

According to an embodiment, an electronic device may include a first antenna, a second antenna, a communication module that transmits and receives UWB signals by using the first antenna, a power transceiver module that transmits and receives signals related to charging of the electronic device or LF signals by using the second antenna, and a processor that is operatively connected to the communication module, the power transceiver module, the first antenna, and the second antenna. The communication module may be configured to receive an UWB signal from an external device, identify a communication state between the external device and the electronic device using information about communication quality included in the UWB signal, identify a signal received by the power transceiver module by decoding the received signal based on the identified communication state, and determine a distance between the electronic device and the external device based on whether the received signal is an LF signal.

The communication module may identify that the electronic device is located within a specified distance from the external device, based on the received signal being the LF signal when the information about the communication quality is less than a specified first threshold value, or when the information about the communication quality is less than a specified second threshold value and the identified communication state is a NLOS environment.

The electronic device may further include a memory operatively connected to the processor, where the memory stores instructions that, when executed, cause the processor to provide the communication module with a result of identifying whether the power transceiver module receives the LF signal from the external device.

The communication module may determine the distance between the external device and the electronic device by using the UWB signal based on the information about the communication quality being greater than or equal to a specified second threshold value.

The power transceiver module may further include a decoder, where the power transceiver module may decode the signal received through the second antenna by the power transceiver module, by using the decoder, and determine whether the received signal is the LF signal or a signal related to charging of the electronic device. The communication module may receive a result of identifying the LF signal by the power transceiver module, and identify that the power transceiver module receives the LF signal from the external device.

The second antenna may include a coil antenna for charging the electronic device.

The power transceiver module may decode the signal received through the second antenna to determine whether the signal is the LF signal or a signal related to the charging of the electronic device.

The communication module may identify that the electronic device is located inside the external device based on the reception of the LF signal.

The communication module may determine the distance between the external device and the electronic device by using the UWB signal based on the information about the communication quality being greater than or equal to a specified first threshold value and less than a specified second threshold value.

According to an embodiment, a ranging method of an electronic device may include receiving a ultra-wideband (UWB) signal from an external device through a first antenna, identifying a communication state between the external device and the electronic device using information about communication quality included in the UWB signal, identifying a signal received through a second antenna by decoding the received signal based on the identified communication state; and determining a distance between the electronic device and the external device based on whether the received signal is a low frequency (LF) signal.

Identifying the communication state may include identifying that the electronic device is located within a specified distance from the external device, based on the received signal being the LF signal when the information about the communication quality is less than a specified first threshold value, or when the information about the communication quality is less than a specified second threshold value and the identified communication state is a non-line of sight (NLOS) environment.

The ranging method may further include determining the distance between the external device and the electronic device by using the UWB signal based on the information about the communication quality being greater than or equal to a specified second threshold value.

The ranging method may further include receiving a result of determining whether the LF signal is received from an LF antenna of the external device from a processor.

Determining whether the electronic device is within a specified distance from the external device may include identifying that the electronic device is located inside the external device.

The ranging method may further include determining the distance between the external device and the electronic device by using the UWB signal, based on the information about the communication quality being greater than or equal to a specified first threshold value.

According to an embodiment, an electronic device may include a first antenna, a second antenna, a communication module that transmits and receives ultra-wideband (UWB) signals using the first antenna, a power transceiver module that transmits and receives signals related to charging of the electronic device and LF signals using the second antenna, and a processor operatively connected to the communication module, the power transceiver module, the first antenna, and the second antenna. The communication module may receive an UWB signal from an external device through the first antenna, identify a communication state between the external device and the electronic device using information about communication quality included in the UWB signal, and identify that the power transceiver module receives an LF signal from the external device by decoding a signal received at the power transceiver module through the second antenna, when the communication state is a NLOS environment and the information about the communication quality is less than a specified first threshold value. The communication module may determine a distance between the external device and the electronic device by using the UWB signal, when the information about the communication quality is greater than or equal to a specified second threshold value, and identify that the electronic device is located inside the external device when the LF signal is identified.

The communication module may determine the distance between the external device and the electronic device by using the UWB signal, when the information about the communication quality being less than the specified second threshold value and the information about the communication quality is greater than or equal to the specified first threshold value.

The electronic device may further include a memory operatively connected to the processor, where the memory stores instructions that, when executed, cause the processor to provide the communication module with a result of identifying whether the power transceiver module receives the LF signal from the external device.

The power transceiver module further includes a decoder, where the power transceiver module may decode the signal received through the second antenna by the power transceiver module, using the decoder, and determine whether the received signal is the LF signal or a signal related to charging the electronic device, and the communication module may receive a result of identifying the LF signal by the power transceiver module, and identify that the power transceiver module receives the LF signal from the external device.

The second antenna may include a coil antenna for charging the electronic device.

Hereinafter, a ranging method of the electronic device 200 according to an embodiment will be described with reference to FIG. 4. For clarity of explanation, overlapping with those described above will be simplified or omitted.

Figure 4:
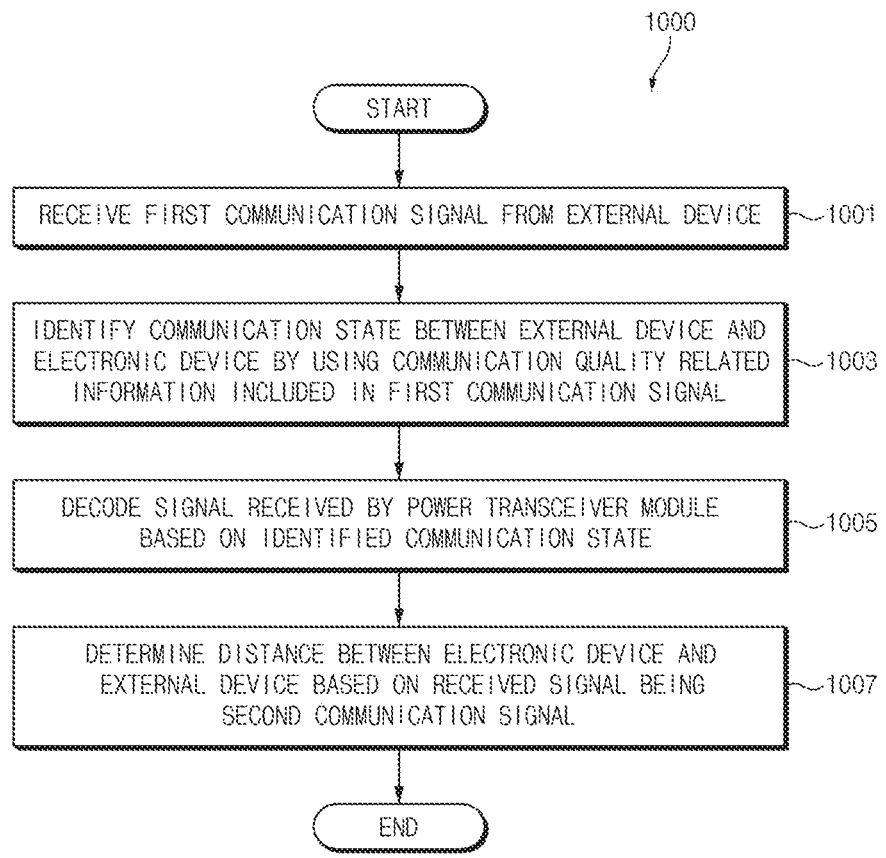
FIG. 4 is a flowchart illustrating a ranging method of an electronic device according to an embodiment.

FIG. 4 is a flowchart illustrating a ranging method of the electronic device according to an embodiment.

Hereinafter, it is assumed that the electronic device 200 of FIG. 2 performs the processes of FIG. 4. The operations described as being performed by the electronic device 200 may be implemented with instructions (commands) that can be performed (or executed) by the communication module 210 of the electronic device 200. For example, the instructions may be stored in a computer recording medium or a memory (e.g., the memory 230 or a memory included in the communication module 210).

Referring to FIG. 4, in operation 1001 of flowchart 1000, an electronic device (e.g., the communication module 210) receives a first communication signal (e.g., the UWB signal) from an external device 300 through a first antenna 211.

In step 1003, the electronic device identifies a communication state between the electronic device and the external device using communication quality related information included in the first communication signal. The electronic device may determine whether the communication state between the electronic device and the external device is an LOS environment or an NLOS environment, by using the communication quality related information.

In step 1005, the electronic device decodes the signal received by the power transceiver module 240 based on the identified communication state to identify the received signal. The electronic device may determine whether the signal received by the power transceiver module is a signal related to charging of the electronic device or a second communication signal (e.g., an LF signal).

In step 1007, the electronic device determines the distance between the electronic device and the external device based on the received signal being the second communication signal. For example, the electronic device may identify that the electronic device is located within a specified distance from the LF antenna of the external device, based on the received signal being the second communication signal. The electronic device may determine that the electronic device is located inside the external device based on the received signal being the second communication signal.

Steps 1003 and 1005 may be performed simultaneously with step 1001. For example, while performing ranging with an external device in step 1001, the electronic device may identify the communication state by using the communication quality related information included in the first communication signal in step 1003, and identify the signal received by the power transceiver module by decoding the received signal based on the identified communication state in step 1005.

A ranging method of the electronic device 200 according to an embodiment is described with reference to FIGS. 5 through 8B. For clarity of explanation, operations or descriptions that overlap with those described above will be simplified or omitted.

Figure 5:
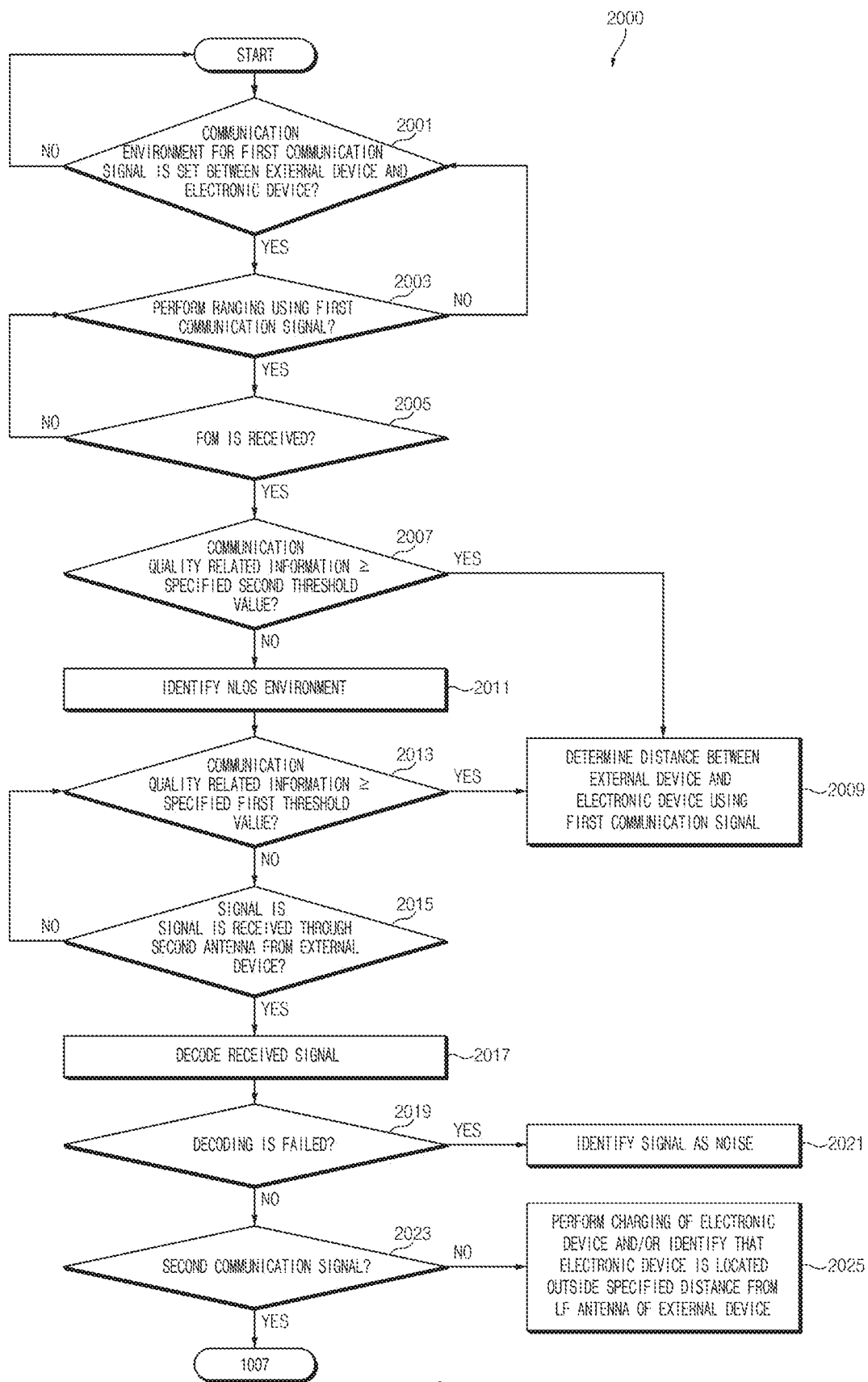
FIG. 5 is a flowchart illustrating a ranging method of an electronic device according to an embodiment.
Figure 6:
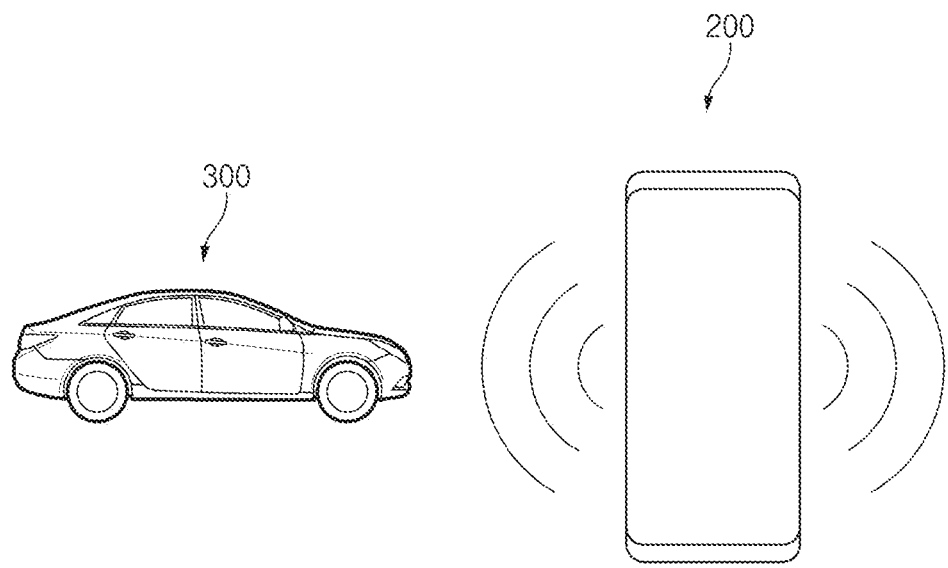
FIG. 6 is a diagram illustrating an electronic device and an external device according to an embodiment.
Figure 7:
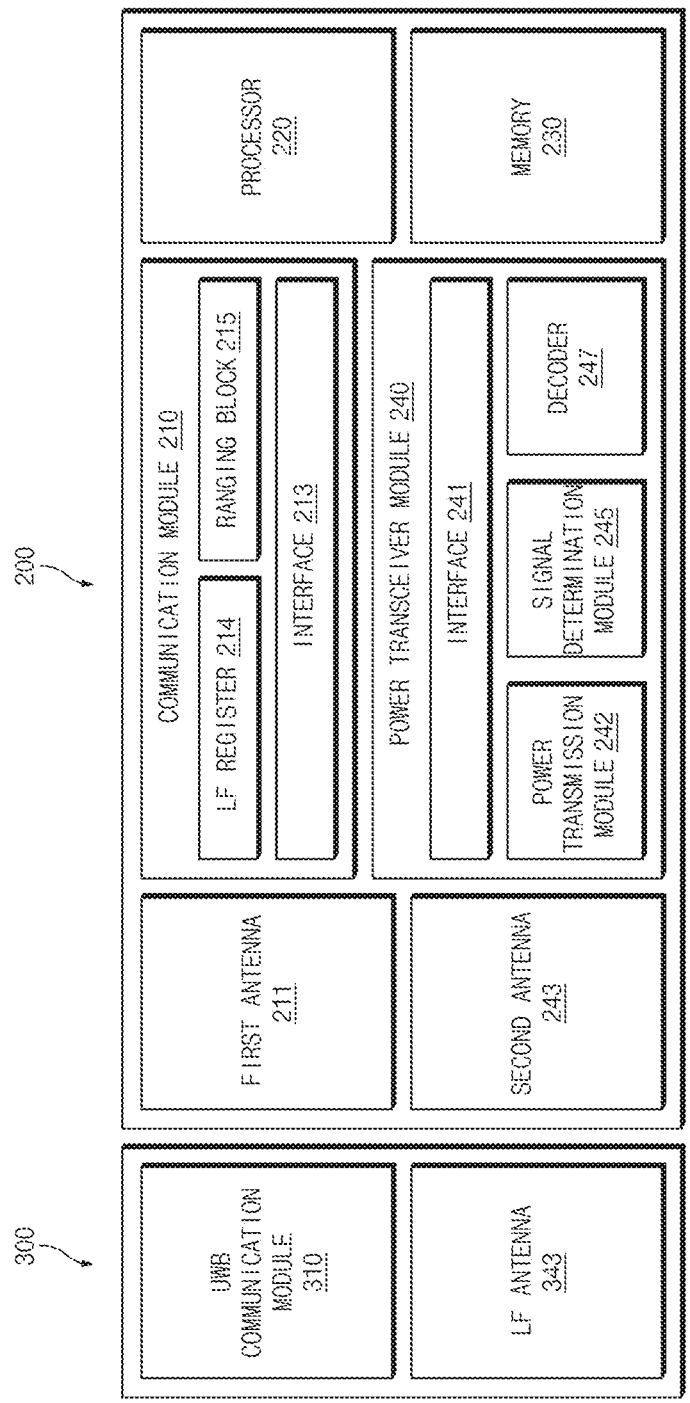
FIG. 7 is a diagram illustrating an electronic device and an external device according to an embodiment.
Figure 8A:
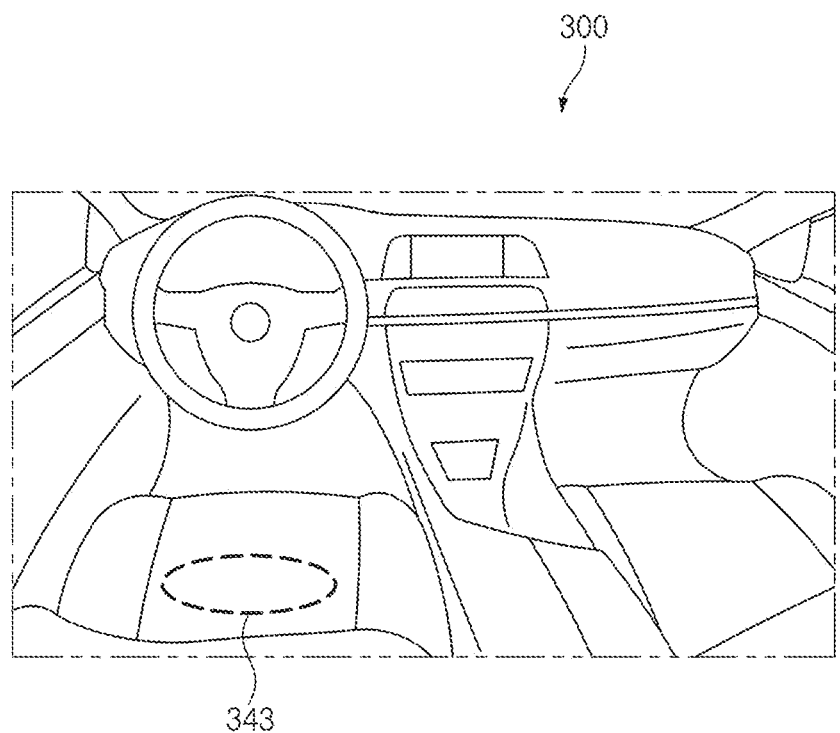
FIG. 8A is a diagram illustrating that an electronic device determines a distance from an external device according to an embodiment.
Figure 8B:
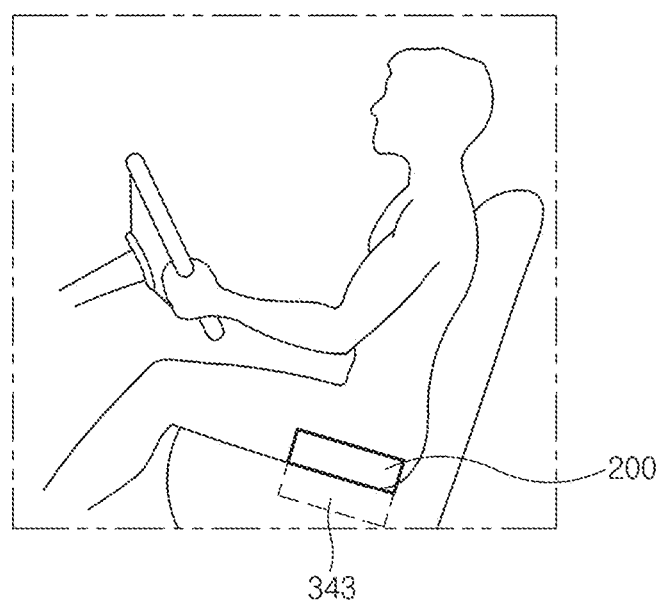
FIG. 8B is a diagram illustrating that an electronic device determines a distance from an external device according to an embodiment.

FIG. 5 is a flowchart illustrating a ranging method of the electronic device according to an embodiment. Specifically, FIG. 5 is a diagram illustrating each operation of FIG. 4 in detail. FIG. 6 is a diagram illustrating the electronic device and the external device according to an embodiment. FIG. 7 is a diagram illustrating the electronic device and the external device according to an embodiment. FIG. 8A is a diagram illustrating that the electronic device determines a distance from the external device according to an embodiment. FIG. 8B is a diagram illustrating that the electronic device determines a distance from the external device according to an embodiment.

It is assumed that the electronic device 200 of FIG. 2 performs the processes of FIG. 5. The operations described as being performed by the electronic device 200 may be implemented with instructions (commands) that can be performed (or executed) by the communication module 210 of the electronic device 200. For example, the instructions may be stored in a computer recording medium or a memory (e.g., the memory 230 or a memory included in the communication module 210).

Referring to FIG. 5, in step 2001 of flowchart 2000, the electronic device (e.g., the communication module 210) determines whether a communication environment for a first communication signal (e.g., a UWB signal) between an external device and an electronic device is set.

When the communication environment is set, the electronic device determines whether the ranging with an external device is performed by using the first communication signal, in step 2003. When the electronic device determines that ranging with the external device is not being performed by using the first communication signal, step 2001 is performed again.

When the electronic device performs the ranging with the external device by using the first communication signal, the electronic device determines whether an FoM is received, in step 2005. When it is determined that the electronic device has not received the FoM, step 2003 is performed again. Steps 2001, 2003 and 2005 correspond to step 1001 of FIG. 4.

Referring to FIGS. 6 and 7, the external device 300 is embodied as a vehicle. However, the embodiment is not limited thereto, and the external device 300 may be a device capable of transmitting the first communication signal and the second communication signal (e.g., the LF signal) to the electronic device 200, and receiving the first communication signal and the second communication signal.

The electronic device 200 and the external device 300 may perform communication using the first communication signal. For example, the electronic device 200 and the external device 300 may transmit and receive the first communication signal, such that the distance between the electronic device 200 and the external device 300 is determined.

The external device 300 includes a UWB communication module 310 and an LF antenna 343. However, the embodiment is not limited thereto, and the external device 300 may further include one or more additional components.

The UWB communication module 310 of the external device 300 may transmit the first communication signal to the electronic device 200. The electronic device 200 may receive the first communication signal by using the first antenna 211 of the communication module 210. The electronic device 200 may transmit the first communication signal to the external device 300 by using the first antenna 211 of the communication module 210. The UWB communication module 310 of the external device 300 may receive the first communication signal by using a UWB antenna. The electronic device 200 may determine the distance between the external device 300 and the electronic device 200 by using time stamp information of the first communication signal. Referring to FIGS. 5 and 6, it is assumed that the electronic device 200 performs ranging with the external device 300, but the embodiments of the disclosure are not limited thereto. For example, the electronic device 200 may determine a distance between the electronic device 200 and at least one other external device through ranging.

Referring back to FIG. 5, when it is determined that the electronic device has received the FoM, the electronic device determines the communication state by comparing the communication quality related information with the specified second threshold value, in step 2007.

When the communication quality related information is greater than or equal to the specified second threshold value, the electronic device determines the distance between the external device and the electronic device by using the first communication signal, in step 2009. For example, the electronic device may determine the distance between the external device and the electronic device by using the time stamp information included in the first communication signal. When the communication quality related information is greater than or equal to the specified second threshold value, the communication state between the electronic device and the external device may be an LOS environment. The reliability (or accuracy) of the distance between the external device and the electronic device determined under the LOS environment may be higher than that of the distance between the external device and the electronic device determined under the NLOS environment.

When the communication quality related information is less than the specified second threshold value, the electronic device identifies that the communication state between the electronic device and the external device is the NLOS environment, in step 2011.

In step 2013, the electronic device compares the communication quality related information with the specified first threshold value based on the communication state being identified as the NLOS environment.

When the communication related information is greater than or equal to the specified first threshold value, the electronic device performs step 2009. Even in the NLOS environment, the electronic device may determine the distance between the external device and the electronic device by using the first communication signal when the communication quality related information is greater than or equal to the specified first threshold value.

Steps 2007, 2009, 2011 and 2013 correspond to step 1003 of FIG. 4.

When the communication quality related information is less than the specified first threshold value, the electronic device determines whether a signal is received through the second antenna from the external device, in step 2015. The electronic device may receive a signal related to charging of the electronic device or the second communication signal from the external device through the second antenna.

When the electronic device does not receive a signal from the external device through the second antenna, step 2013 is performed again.

When the electronic device receives a signal from the external device through the second antenna, the electronic device identifies a type of the received signal by decoding the signal received through the second antenna, in step 2017.

In step 2019, the electronic device may determine whether it is failed to decode the received signal.

When it failed to decode the received signal, the electronic device may identify that the received signal is noise, in step 2021.

When it is successful in decoding the received signal, the electronic device determines the type of the received signal based on the decoding result, in step 2023. The electronic device may determine whether the received signal is a WPC related signal or a PMA related signal. When the wake-up pattern is included in the decoding result, the electronic device may identify that the second communication signal is received.

Steps 2015, 2017, 2019, 2021 and 2023 correspond to step 1005 of FIG. 4.

When the received signal is the WPC related signal or the PMA related signal, the electronic device identifies that the electronic device is located outside a specified distance from the LF antenna of the external device, in step 2025. In an embodiment in which the external device 300 is a vehicle, when the communication state is the NLOS environment and the communication quality related information is less than the specified first threshold value, the electronic device may identify that the electronic device is outside the vehicle when the electronic device does not receive an LF signal. When the communication state is the NLOS environment and the communication quality related information is less than the specified first threshold value, the reliability (or accuracy) of the distance between the external device and the electronic device determined by using the first communication signal may be very low. When the electronic device does not receive the second communication signal and receives a signal related to charging of the electronic device, the electronic device may perform charging of the electronic device by using the signal related to charging of the electronic device. Step 2025 corresponds to the step 1007 of FIG. 4.

Based on the signal received in step 2023 being the second communication signal, step 1007 of FIG. 4 is performed. For example, the electronic device may identify that the electronic device is located within a specified distance from the LF antenna of the external device, based on that the second communication signal is received. The electronic device may identify that the electronic device is located inside the external device based on that the second communication signal is received.

Referring to FIGS. 6, 7, 8A and 8B, the second communication signal may be, for example, a signal transmitted from the external device 300 to the electronic device 200 through the LF antenna 343. The electronic device 200 may receive the second communication signal through the second antenna 243 of the power transceiver module 240. The communication module 210 may determine whether the power transceiver module 240 has received the second communication signal.

In an embodiment in which the external device 300 is a vehicle, the LF antenna 343 of the external device 300 may be arranged inside the external device 300. The electronic device 200 may identify that the electronic device 200 is located inside the vehicle within a specified distance from the LF antenna 343 of the external device 300 based on that the second communication signal is received.

For example, as shown in FIG. 8B, when a user of the electronic device 200 boards a vehicle that is the external device 300 while possessing the electronic device 200, the user may be an obstacle in the communication between the electronic device 200 and the external device 300. When a user of the electronic device 200 boards a vehicle that is the external device 300 while possessing the electronic device 200, the electronic device 200 may identify that the communication state is an NLOS environment and the communication quality related information is less than the specified first threshold value. In this case, when the electronic device 200 uses the UWB signal to determine the distance between the electronic device 200 and the external device 300, the reliability (or accuracy) of the determined distance may be lower than that determined under the LOS environment. In other words, when the communication quality related information is less than the specified first threshold value, the reliability (or accuracy) of the distance between the electronic device 200 and the external device 300 determined by using the UWB signal may be very low. Accordingly, when it is identified that the communication quality related information is less than the specified first threshold value, the electronic device 200 may detect the LF signal received by the electronic device 200 (e.g., the power transceiver module 240) from the LF antenna 343 of the external device 300. When it is identified that the power transceiver module 240 has received the LF signal, the electronic device 200 may identify that the electronic device 200 is located inside a vehicle which is within a specified distance from the LF antenna 343 of the external device 300.

In the electronic device, when the accuracy of the distance between the electronic device and the external device determined by using the UWB signal is not reliable, it is possible to identify the location of the electronic device by using the LF signal. An electronic device may identify a communication state between the electronic device and the external device and compare the communication quality related information included in the UWB signal with a specified threshold value, such that it is possible to compensate for the reliability of accuracy of the distance determined by using the UWB signal. An electronic device may use the UWB signal to determine the distance between the electronic device and the external device, and only when the communication quality related information is less than the specified threshold value (e.g., the specified first threshold) in the NLOS environment, may improve the accuracy of the distance measurement by using the LF signal.

When the location measurement is performed by using a UWB signal to control a vehicle by using a user's terminal (e.g., an electronic device) and the user of the terminal gets in the vehicle while possessing the terminal, the user may be an obstacle of communication between the terminal and the vehicle. In this case, even in an environment in which the accuracy of location measurement between a vehicle and a user's terminal is unreliable, the accuracy of location measurement may be improved by using an LF signal.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, the ranging accuracy may be improved by performing ranging using the LF signal only in a certain state.

According to an embodiment, it is possible to improve the accuracy of ranging by detecting whether an LF signal is received based on information included in the UWB signal.

In addition, various effects that are directly or indirectly understood through the present disclosure may be provided.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
   a first antenna;
   a second antenna;
   a communication module configured to transmit and receive ultra-wideband (UWB) signals using the first antenna;
   a power transceiver module configured to transmit and receive signals related to charging of the electronic device and low frequency (LF) signals, using the second antenna;
   a processor operatively connected to the communication module, the power transceiver module, the first antenna, and the second antenna,
   wherein the communication module is configured to:
      receive an UWB signal from an external device;
      identify a communication state between the external device and the electronic device using information about communication quality included in the UWB signal;
      identify a signal received by the power transceiver module by decoding the received signal based on the identified communication state; and
      determine a distance between the electronic device and the external device based on whether the received signal is an LF signal.

2. The electronic device of claim 1, wherein the communication module is further configured to identify that the electronic device is located within a specified distance from the external device, based on the received signal being the LF signal when the information about the communication quality is less than a specified first threshold value, and, when the information about the communication quality is less than a specified second threshold value and the identified communication state is a non-line of sight (NLOS) environment.

3. The electronic device of claim 2, further comprising:
   a memory operatively connected to the processor,
   wherein the memory stores instructions that, when executed, cause the processor to:
      provide the communication module with a result of identifying whether the power transceiver module receives the LF signal from the external device.

4. The electronic device of claim 1, wherein the communication module is further configured to:
   determine the distance between the external device and the electronic device by using the UWB signal based on the information about the communication quality being greater than or equal to a specified second threshold value.

5. The electronic device of claim 1, wherein:
   the power transceiver module comprises a decoder, and the power transceiver module is configured to:
      decode the signal received through the second antenna by the power transceiver module, using the decoder, and determine whether the received signal is the LF signal or a signal related to charging the electronic device; and the communication module is configured to:
receive a result of identifying the LF signal by the power transceiver module, and identify that the power transceiver module receives the LF signal from the external device.

6. The electronic device of claim 1, wherein the second antenna comprises a coil antenna for charging the electronic device.

7. The electronic device of claim 6, wherein the power transceiver module is configured to:
decode the signal received through the second antenna to determine whether the signal is the LF signal or a signal related to charging the electronic device.

8. The electronic device of claim 1, wherein the communication module is further configured to:
identify that the electronic device is located inside the external device based on the reception of the LF signal.

9. The electronic device of claim 1, wherein the communication module is further configured to:
determine the distance between the external device and the electronic device using the UWB signal based on the information about the communication quality being greater than or equal to a specified first threshold value and less than a specified second threshold value.

10. A ranging method of an electronic device, the ranging method comprising:
receiving a ultra-wideband (UWB) signal from an external device through a first antenna;
identifying a communication state between the external device and the electronic device using information about communication quality included in the UWB signal;
identifying a signal received through a second antenna by decoding the received signal based on the identified communication state; and
determining a distance between the electronic device and the external device based on whether the received signal is a low frequency (LF) signal.

11. The ranging method of claim 10, wherein identifying the communication state comprises:
identifying that the electronic device is located within a specified distance from the external device, based on the received signal being the LF signal when the information about the communication quality is less than a specified first threshold value, and, when the information about the communication quality is less than a specified second threshold value and the identified communication state is a non-line of sight (NLOS) environment.

12. The ranging method of claim 11, further comprising:
determining the distance between the external device and the electronic device by using the UWB signal based on the information about the communication quality being greater than or equal to a specified second threshold value.

13. The ranging method of claim 11, further comprising:
receiving, from a processor of the electronic device, a result of determining whether the LF signal is received from an LF antenna of the external device.

14. The ranging method of claim 11, wherein determining the electronic device is within a specified distance from the external device comprises:
identifying that the electronic device is located inside the external device.

15. The ranging method of claim 10, further comprising:
determining the distance between the external device and the electronic device using the UWB signal, based on the information about the communication quality being greater than or equal to a specified first threshold value.

16. An electronic device comprising:
a first antenna;
a second antenna;
a communication module configured to transmit and receive ultra-wideband (UWB) signals using the first antenna;
a power transceiver module configured to transmit and receive signals related to charging of the electronic device and low frequency (LF) signals using the second antenna; and
a processor operatively connected to the communication module, the power transceiver module, the first antenna, and the second antenna,
wherein the communication module is configured to:
receive an UWB signal from an external device through the first antenna;
identify a communication state between the external device and the electronic device using information about communication quality included in the UWB signal;
identify that the power transceiver module receives an LF signal from the external device by decoding a signal received at the power transceiver module through the second antenna, when the communication state is a non-line of sight (NLOS) environment and the information about the communication quality is less than a specified first threshold value,
determine a distance between the external device and the electronic device by using the UWB signal, when the information about the communication quality is greater than or equal to a specified second threshold value, and
identify that the electronic device is located inside the external device when the LF signal is identified.

17. The electronic device of claim 16, wherein the communication module is further configured to determine the distance between the external device and the electronic device by using the UWB signal, when the information about the communication quality is less than the specified second threshold value and the information about the communication quality is greater than or equal to the specified first threshold value.

18. The electronic device of claim 16, further comprising:
a memory operatively connected to the processor,
wherein the memory stores instructions that, when executed, cause the processor to:
provide the communication module with a result of identifying whether the power transceiver module receives the LF signal from the external device.

19. The electronic device of claim 16, wherein:
the power transceiver module comprises a decoder, and the power transceiver module is configured to:
decode the signal received through the second antenna by the power transceiver module, using the decoder, and determine whether the received signal is the LF signal or a signal related to charging the electronic device; and the communication module is configured to:
receive a result of identifying the LF signal by the power transceiver module, and identify that the power transceiver module receives the LF signal from the external device.

20. The electronic device of claim 16, wherein the second antenna comprises a coil antenna for charging the electronic device.

* * * * *